Figure 1:
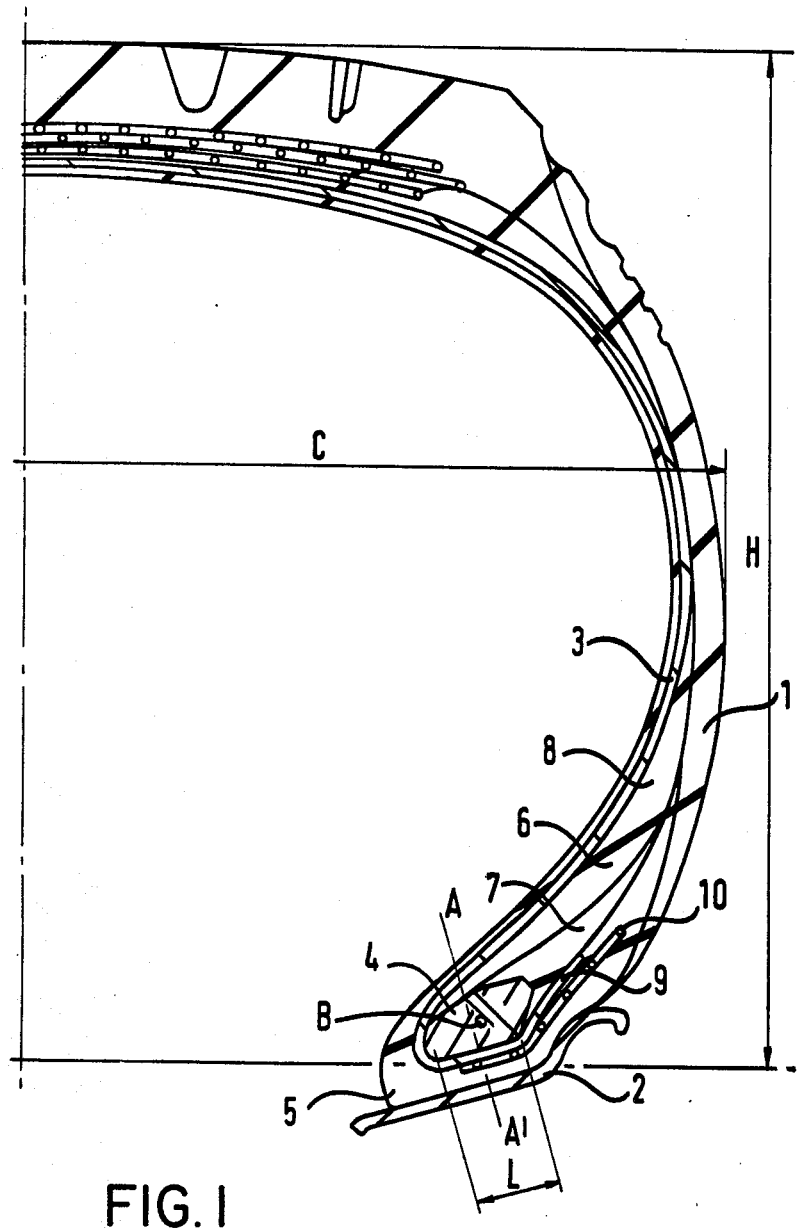

United States Patent [19]

Maiocchi

[11] 4,180,116
[45] Dec. 25, 1979

[54] RADIAL TIRES

[76] Inventor: Luigi Maiocchi, Vernate - Fraz. Moncucco, Via Mazzini, 1 Milan, Italy

[21] Appl. No.: 860,573

[22] Filed: Dec. 14, 1977

[30] Foreign Application Priority Data

Dec. 20, 1976 [IT] Italy ............................. 30602 A/76

[51] Int. Cl.$^2$ ............................................. B60C 15/04
[52] U.S. Cl. ................................................. 152/362 R
[58] Field of Search ............ 152/362 R, 362 CS, 379.1

[56] References Cited

U.S. PATENT DOCUMENTS

| 2,292,980 | 8/1942 | White | 152/362 R |
| 3,861,442 | 1/1975 | Bertrand | 152/362 R |
| 3,949,800 | 4/1976 | Lejeune | 152/362 R |
| 3,964,533 | 6/1976 | Arimura | 152/362 R |
| 4,076,066 | 2/1978 | Verdier | 152/362 R X |

FOREIGN PATENT DOCUMENTS 2458923  6/1975  Fed. Rep. of Germany ...... 152/362 R

Primary Examiner—Joseph F. Peters, Jr.
Assistant Examiner—D. W. Underwood
Attorney, Agent, or Firm—Stevens, Davis, Miller & Mosher

[57] ABSTRACT

A radial carcass motor vehicle tire having a cross-section in which the ratio of the section height/overall width is less than 1 and preferably not greater than 0.7 and which is intended to be mounted on a rim provided with bead-seats inclined at an angle of 15° with respect to the rotation axis, is provided with a bead-wire core around which the extremity of the carcass ply or plies, is turned-up from the inside towards the outside. The bead-wire cores are formed of rubberized metallic wires, wound spirally so as to present a polygonal cross-section elongated in the axial direction. The base of the core is inclined at an angle of 15° with respect to the rotation axis. The bead-core has an irregular geometrical section, having its bary-center axially shifted to the outside with respect to the line of the mid-plane of the bead-core base from between 7% to 30% of the axial width of the bead-core base.

5 Claims, 3 Drawing Figures

FIG. I

RADIAL TIRES

This invention relates to an improved radial-ply vehicle tire, and in particular, it relates to bead-wire cores for tubeless radial tires—i.e. tires which are to be mounted on vehicle tire rim without an inner tube.

As is well known, tires of the type indicated above, are normally mounted on rims having inclined surfaces (or bead-seats), the angle of inclination being about 15°—with respect to the rotation axis. Correspondingly, the bead-base—i.e. the surface of the beads, with which the said beads contact the rim, is also inclined—approximately at the very same angle of inclination.

For guaranteeing a stable position for the bead on the rim while the tire is in use on the vehicle wheel, and for preventing the inflation air from escaping, and/or to prevent the bead from dislodging from its seat on the rim, the beads themselves are usually provided with a bead-wire core. In the case of radial tubeless tires, the tires to which our invention specifically relates, the bead-wire cores that are mainly used, are of the type having a hexagonal cross-section, with the base inclined in the same direction as the bead in which they are embedded.

These bead-wire cores are obtained by winding a rubberzied steel wire (of a suitable diameter), a plurality of turns, until the desired cross-section is obtained.

It is also well-known that the current tendency is to constitute the tires just described—and which are destined to be used for truck vehicles, with smaller cross-sections—i.e. tires having cross-sections where the ratio H/C (height of tire section/overall width of the section) is smaller than 1, and preferably not greater than 0.7.

In manufacturing the tires in the conventional manner—i.e. by utilizing the above-said bead-wire cores, the Applicant has come across a lower tendency in the head for resisting fatigue—that is not overcome by any further reinforcement being applied to the bead itself, such as the usual reinforcing layers. This is due to the fact that the tires that have lowered cross-sections, meaning those tires intended for carrying the same loads as any other tires having the normal cross-sections, are subject to undergoing, greater squeezing percentagewise in the radial sense under service conditions. The consequence of this is reflected directly in the bead zone, since the sidewalls (being only provided with radial plies), cannot offer any resistence against these stresses.

It is also known that in tires having reduced sections, the sidewall portions nearest to the relative bead, diverge, with respect to the equatorial plane of the tire, much more than in the case of tires having normal sections. Consequently, the bead portion that is found overhanging the rim flange, is inclined, with respect to the rotation axis of the tire; as a consequence of this, and in spite of the reinforcing elements existing here (filler of very hard rubber/fabric-cord layers), said portion, during exercise, deforms, substantially collapsing in the direction of the rotation axis. As a result of this, the tire permanently assumes a deformed shape in this specific zone which renders it unacceptable for the usual practice of re-utilizing the tire carcass by retreading after the original tread has worn, as is usually done for large-dimension tires.

An object of our invention is to construct a radial tire of the tubeless type, having reduced section, to be used on truck vehicles, said tires comprising beads having a high resistance to fatigue, and also being substantially devoid of the permanent deformations described above.

The Applicant has found surprisingly, that this object can actually be reached, through adopting, for the bead, a bead-wire core having a special section, the bary-center of which is axially outside, with respect to the line of the mid-plane of the core base of the said bead-wire core itself.

"Bary-center" is used herein to mean the center of gravity which is consistent with the definition of the term in Webster's New International Dictionary, 2nd Edition, Unabridged, published by G. & C. Merriam, Publishers, of Springfield, Mass., 1954.

Hence, the object of the present invention is a radial-ply tire, having a ratio H/C not greater than 0.7, and which is to be mounted on a rim provided with bead-seats that are inclined at an angle of 15° with respect to the rotation axis, said tire having beads, each of which has a bead-wire core embedded therein, around which there is wound, from inside towards the outside, the extremity of the carcass ply or plies, the said bead-wire core being constituted of rubberized metallic wires wound spirally, so as to present a polygonal cross-section having an elongate shape, in the axial sense, and which has the side constituting the bead-wire core base, also inclined at an angle of 15° with respect to the rotation axis, characterized by the fact that the bead-wire core has an irregular geometrical section that has its bary-center shifted axially to the outside, with respect to the line of the mid-plane of the bead-wire core base—between 7% and 30% of the axial width of the said base.

As stated above, the bead-wire core with which each tire bead is provided in accordance with the invention, has an irregular geometrical section. Preferably, this polygonal section consists of the ideal association of two polygons, one of which is an irregular polygon having at least five sides—the longest of these sides constituting the bead-wire core base, and the other polygon being a more or less regular trapeze—the greater base of which is coincidental with the side of the irregular polygon which is adjacent to the base of the bead-wire core in the axially outside position of the bead. As an alternative, the polygon can be an isosceles triangle, its base coinciding with the side (as said above) of the irregular polygon.

It therefore becomes quite evident that, in the said polygon section of the bead-wire core, the trapeze or isosceles triangle represents that portion of the bead-wire core that elongates towards the rim flange.

As previously stated, the adoption of the special bead-wire core allows for both, increasing the resistence to fatigue of the bead in a tubeless radial tire having a lowered section, as well as for preventing the permanent deformations of the portion of the bead that overhangs the rim flange extremity.

Probably, this is due to the fact that, besides the objective increasing of the cross-section of the bead-wire core itself, with respect to that of the traditional bead-wire cores, its particular geometrical shape plays an important role, with regard to the turnups of the carcass ply, (or plies), —(that as usual are placed turned-up towards the outside of the tire), and with regard to eventual reinforcing elements disposed axially at the outside with respect to the bead-wire core, and preferably, between these turn-ups and the outside surface of the bead. In other words, this bead-wire core, by having its bary-center axially shifted towards the outside with respect to the line of the mid-plane of the bead wire core base itself, has (with respect to the turn-ups of the carcass ply or plies, and the reinforcing axially outwardly settled elements), a protective function with regard to the effects of the stresses to which the bead is subjected under service conditions which as a consequence, reduces the tendency of the bead to wear. To this can also be added a high resistence to abrasions that is encountered in correspondence of the outer surface of the bead in the zone facing the rim.

Figure 2:
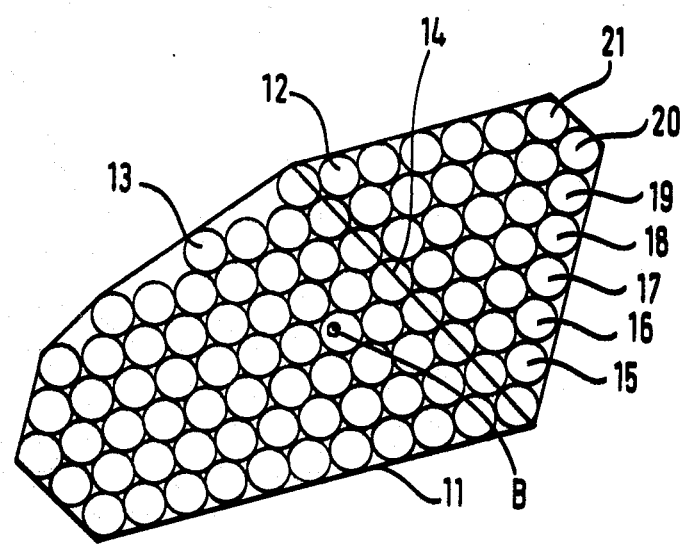
Figure 3:
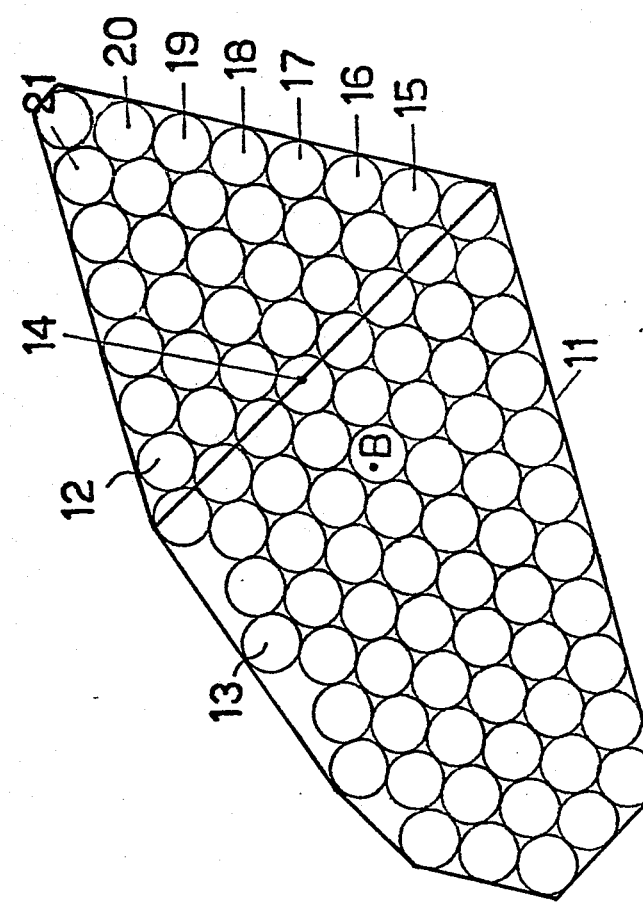

The present invention will be better understood from the following description, made with reference to the attached FIGS. 1 and 2, and given solely by way of non-limiting example, for describing a preferred embodiment for the bead-wire core that is provided in each bead.

In particular, the FIG. 1 represents, in a semi-radial section, a tire 1 (of the size 12/70 R22.5) of the tubeless type, mounted on rim 2 having its bead-seats inclined at an angle of 15°—with respect to the axis of rotation. This tire has a section having the ratio H/C equal to 0.7, and it is provided with a radial carcass 3 (i.e. a carcass constituted by one or more plies, the cords of which lie on radial planes or form small angles with respect to these planes; said plies are wound around each bead-wire core 4, so as to turn-up towards the outside). The base or leaning surface of each bead 5, after being mounted on the rim, is inclined at an angle of 15°, which is the inclination of the bead-seat on the rim. In addition to bead-wire core 4, the bead has a filler 6 of rubber, having a substantially triangular section, which, in a way known per se, consists of two lenticular profiles connected together, the axially external one 7, being constituted by a rubber compound having an increased hardness—equal to 78° Shore A; and the axially innermost one 8, which elongates radially, to halfway the section height, being constituted by a rubber compound having a lower hardness—in practice equal to 65° Shore A.

As an alternative, this filler can be constituted by a single profile with a triangular section, constituted by a rubber compound having an increased hardness (78° Shore A). In the position axially external to the turn-ups 9 of the carcass plies, there is a reinforcing element 10, consisting of a layer of a metallic-cord fabric the cords of which have an elongation-at-break equal to 7% which are inclined with respect to the circumferential direction of the tire at an angle of 30°. This layer extends radially in the upwards direction to surpass the extremity of the turn-up 9, and in the downwards direction to reach under the bead-wire core 4. This reinforcing element, the presence of which is quite necessary in tires having the size represented in the figure, may however, be missing in tires having smaller sizes such as that of the transport series (7R 17.5; 8R 17.5; 8.5R 17.5) or else in giant tires having small sizes (8R 22.5; 9R 22.5).

In the bead-wire core 4—that is the essential element in tires according to this invention, the bary-center B can be discovered, and is axially shifted to the outside with respect to the mid-plane (line A—A') of the base of the bead-wire core 4, according to a value equal to 11% of the width of the base itself. In practice, as the width 'L' of the said base is equal to 19 mm, the bary-center of the bead-wire core is found to be shifted towards the outside—with respect to the mid-plane (A—A') by 2.1 mm.

This bead-wire core is constituted by winding a steel wire having a diameter equal to 1.6 mm, rubberized so as to have the overall diameter equal to 1.8 mm according to a plurality of turns that overlap until the section represented in FIG. 1 is obtained (shown in more detail in FIG. 2). As can be seen in FIG. 2, this section is an irregular polygon, the side 11, facing the base of the bead 5 (bead-wire core 'base') being parallel to the bead-seats on the rim. In this section can be distinguished, as being joined together, a regular trapeze 12 and an irregular hexagon 13; in said trapeze, the greater base 14 coinciding with the side which, in the hexagon, is adjacent to the base 11 at the part that, in the bead, is facing towards the outside of the tire.

In practice, a section can be obtained by winding rubberized steel wire into a convenient shape, with a surface inclined at an angle of 15° so as to form over it a first layer—corresponding to the bead-wire core base 11 and successively, two layers 15 and 16, that increase regularly—each by one turn, with respect to the one that precedes, and this to project in correspondence of both edges, by half a turn. After this, the wire that constitutes the two successive layers 17 and 18 is applied with constant turns, with respect to the layer 16, but by shifting the start of the spiral by half a turn, so that in correspondence of one edge (precisely the edge that will be coaxially outside in the bead) there is a constant increasing, and—in correspondence of the opposite edge, there is a constant decreasing, by half turns.

The layers 19, 20, and 21, are then formed, by decreasing the turns for each one of them respectively by one, two and three turns—with respect to the turn preceding, and shifting the start of the single turn so that in correspondence of the edge which will be axially external of the bead the constant increasing by a half turn will always be verified except for the last layer 21, in order to create the lesser base of the trapeze 12. It is clear that, if it is so desired, this said layer can also be completed as the one preceding it in such a way as to form an isosceles triangle instead of a trapeze. This however, does not imply any substantial influence in the function of the bead-wire core so constituted with respect to the one represented in FIGS. 1 and 2.

It is to be understood that the present invention is not limited merely to what has been described herein, but that the invention includes also within its scope and purview, all the various embodiments that can be derived from the given inventive principle.

What we claim is:

1. In a radial carcass tire having a section of a ratio H/C that is not greater than 0.7, and which is intended to be mounted onto a rim provided with bead-seats inclined at an angle of 15° with respect to the rotation axis, said tire presenting beads, each of which comprises a bead-wire core around which, from inside towards outside, the extremity of the carcass ply or plies is turned-up, said bead-wire cores being consitituted of rubberized metallic wires wound spirally to present a polygonal cross-section elongated in the axial direction, and in which the side constituting the bead-core base, is inclined at an angle of 15° with respect to the said rotation axis, the improvement wherein said polygonal cross-section has an irregular geometrical figure consisting of two associated polygons, said figure having its bary-center axially shifted to the outside, with respect to the line of the mid-plane of the bead-core base, between 7% and 30% of the axial width of the said bead-core base.

2. The tire of claim 1 wherein one of said two associated polygons is an irregular polygon having at least five sides, the longest side of which is the bead-wire core base, the other polygon being a regular trapeze, the longest base of which coincides with the side of the said irregular polygon that lies adjacent to the base of the said bead-wire core, on the side that is in outwardly axial position at the bead heel.

3. The tire of claim 1 wherein one of said polygons is an irregular polygon having at least five sides, the longest side of which is the bead-core base, and the other polygon being an isosceles triangle, the base of which coincides with the side of the said irregular polygon that is adjacent to the said bead-wire core on the side that is an outwardly axial position at the bead heel.

4. The tire of claim 1 wherein the said bead comprises a reinforcing element placed in an outwardly axial position of the said bead-wire core.

5. The tire of claim 1 wherein the said bead comprises, in the radially outward position with regard to the said bead-wire core, a triangular rubber filler, constituted by the association of two lenticular profiles, the axially outer one consisting of a rubber compound having a Shore-A hardness between 70° and 80°, and the axially inner profile consisting of a rubber compound having a Shore-A hardness between 55° and 70°, said inner profile extending at the maximum, up to one-half of the height of the said tire section.

* * * * *

UNITED STATES PATENT AND TRADEMARK OFFICE
CERTIFICATE OF CORRECTION

PATENT NO. : 4,180,116
DATED : December 25, 1979
INVENTOR(S) : Luigi MAIOCCHI

It is certified that error appears in the above-identified patent and that said Letters Patent are hereby corrected as shown below:

Left hand column, first page, immediately below line number [76], insert:

[73] Assignee: Industrie Pirelli S.p.A., Milan, Italy

Signed and Sealed this

First Day of April 1980

[SEAL]

Attest:

SIDNEY A. DIAMOND

Attesting Officer

Commissioner of Patents and Trademarks